(12) United States Patent
Jones et al.

(10) Patent No.: US 9,311,246 B2
(45) Date of Patent: Apr. 12, 2016

(54) CACHE MEMORY SYSTEM

(75) Inventors: Andrew Michael Jones, Bristol (GB); Stuart Ryan, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 706 days.

(21) Appl. No.: 12/284,331

(22) Filed: Sep. 19, 2008

(65) Prior Publication Data

US 2009/0132768 A1     May 21, 2009

(30) Foreign Application Priority Data

Nov. 19, 2007    (GB) .................................. 0722707.7

(51) Int. Cl.
*G06F 12/02*     (2006.01)
*G06F 12/08*     (2006.01)

(52) U.S. Cl.
CPC ........ *G06F 12/0862* (2013.01); *G06F 12/0846* (2013.01); *G06F 12/0853* (2013.01); *G06F 12/0895* (2013.01); *G06F 2212/6024* (2013.01); *G06F 2212/6028* (2013.01)

(58) Field of Classification Search
None
See application file for complete search history.

(56) References Cited

U.S. PATENT DOCUMENTS

| | | | |
|---|---|---|---|
| 5,361,391 A | 11/1994 | Westberg | |
| 5,713,003 A | 1/1998 | DeWitt et al. | |
| 5,761,706 A | 6/1998 | Kessler et al. | |
| 5,944,815 A | 8/1999 | Witt | |
| 5,956,744 A | 9/1999 | Robertson et al. | |
| 5,983,324 A * | 11/1999 | Ukai et al. | 711/137 |
| 6,173,392 B1 | 1/2001 | Shinozaki | |
| 6,643,743 B1 | 11/2003 | Hum et al. | |
| 6,697,909 B1 * | 2/2004 | Wang et al. | 711/106 |
| 6,738,867 B1 | 5/2004 | Kanai | |
| 6,792,508 B1 | 9/2004 | Chauvel et al. | |
| 6,862,657 B1 | 3/2005 | Grimsrud et al. | |
| 7,177,985 B1 | 2/2007 | Diefendorff | |
| 7,512,740 B2 | 3/2009 | Diefendorff | |
| 8,725,987 B2 | 5/2014 | Jones et al. | |
| 2001/0011330 A1 | 8/2001 | Hughes et al. | |
| 2002/0087801 A1 | 7/2002 | Bogin et al. | |
| 2002/0116584 A1 | 8/2002 | Wilkerson | |

(Continued)

FOREIGN PATENT DOCUMENTS

EP      1 111 511 A1    6/2001
GB      2454811 B      11/2012

(Continued)

OTHER PUBLICATIONS

Anoop Gupta, et al., "Comparative Evaluation of Latency Reducing and Tolerating Techniques", 1991 ACM, p. 254-263.

(Continued)

*Primary Examiner* — Charles Rones
*Assistant Examiner* — Ryan Dare
(74) *Attorney, Agent, or Firm* — Allen, Dyer, Doppelt, Milbrath & Gilchrist, P.A.

(57) ABSTRACT

Systems and methods are disclosed that comprise a cache memory for storing a copy of a portion of data stored in a system memory and a cache load circuit capable of retrieving the portion of data from the system memory. The systems and methods further comprise a status memory for identifying whether or not a region of the cache memory contains data that has been accessed from the cache memory by an external device.

20 Claims, 9 Drawing Sheets

(56) References Cited

U.S. PATENT DOCUMENTS

| | | |
|---|---|---|
| 2003/0191900 A1 | 10/2003 | Hooker |
| 2004/0064648 A1 | 4/2004 | Brown et al. |
| 2004/0148473 A1 | 7/2004 | Hughes et al. |
| 2004/0199727 A1 | 10/2004 | Narad |
| 2004/0205300 A1 | 10/2004 | Bearden |
| 2005/0125644 A1 | 6/2005 | Barry et al. |
| 2005/0216666 A1 | 9/2005 | Sih et al. |
| 2006/0075142 A1 | 4/2006 | Cornett et al. |
| 2006/0085602 A1 | 4/2006 | Huggahalli et al. |
| 2006/0112229 A1 | 5/2006 | Moat et al. |
| 2006/0123195 A1 | 6/2006 | Mukherjee |
| 2006/0294322 A1 | 12/2006 | Matsuzaki et al. |
| 2007/0043907 A1 | 2/2007 | Diefendorff |
| 2007/0067577 A1 | 3/2007 | Henry et al. |
| 2007/0113018 A1 | 5/2007 | Brink et al. |
| 2007/0124736 A1 | 5/2007 | Gabor et al. |
| 2007/0204087 A1 | 8/2007 | Birenbach et al. |
| 2008/0104325 A1 | 5/2008 | Narad et al. |
| 2008/0168191 A1 | 7/2008 | Biran et al. |
| 2008/0183913 A1 | 7/2008 | Ryu et al. |
| 2008/0256328 A1 | 10/2008 | Nagarkar et al. |
| 2008/0263257 A1 | 10/2008 | Cain, III et al. |
| 2009/0132750 A1 | 5/2009 | Jones et al. |
| 2009/0307433 A1 | 12/2009 | Jones et al. |
| 2010/0121935 A1* | 5/2010 | Holt .............................. 709/215 |

FOREIGN PATENT DOCUMENTS

| | | |
|---|---|---|
| JP | 2000-353146 | 12/2000 |
| JP | 2003-242027 | 8/2003 |
| WO | WO 2008/085647 A1 | 7/2008 |

OTHER PUBLICATIONS

Search Report dated Jan. 29, 2009 in connection with United Kingdom Patent Application No. GB0821079.1.

Search Report dated Feb. 3, 2009 in connection with United Kingdom Patent Application No. GB0821080.9.

Search Report dated Jan. 26, 2009 in connection with United Kingdom Patent Application No. GB0821078.3.

Search Report dated Feb. 9, 2009 in connection with United Kingdom Patent Application No. GB0821081.7.

Office Action dated Aug. 11, 2011 in connection with U.S. Appl. No. 12/284,332.

Office Action dated Aug. 19, 2011 in connection with U.S. Appl. No. 12/284,336.

Office Action dated Jan. 4, 2012 in connection with U.S. Appl. No. 12/284,329.

Office Action dated Mar. 7, 2012 in connection with U.S. Appl. No. 12/284,332.

Office Action dated Jul. 25, 2012 in connection with U.S. Appl. No. 12/284,336.

Office Action dated Apr. 11, 2013 in connection with U.S. Appl. No. 12/284,329.

Office Action dated Dec. 19, 2012 in connection with U.S. Appl. No. 12/284,329.

* cited by examiner

CACHE MEMORY SYSTEM

CROSS-REFERENCE TO RELATED APPLICATIONS

The present application is related to United Kingdom Patent Application No. 0722707.7, filed Nov. 19, 2007, entitled "CACHE MEMORY SYSTEM". United Kingdom Patent Application No. 0722707.7 is assigned to the assignee of the present application and is hereby incorporated by reference into the present disclosure as if fully set forth herein. The present application hereby claims priority under 35 U.S.C. §119(a) to United Kingdom Patent Application No. 0722707.7.

TECHNICAL FIELD

The present invention relates to systems comprising cache memories, and in particular to systems employing data prefetching.

BACKGROUND

A very large number of systems involve the retrieval of data from a system memory by a device such as a processor. Many of these systems employ a technique known as data caching which exploits a property of data access known as temporal locality. Temporal locality means data that has been accessed recently is the data most likely to be accessed again in the near future. Data caching involves storing, or caching, a copy of recently accessed data in a cache memory that is accessible more quickly and efficiently than the system memory. If the same data is requested again in the future, the cached copy of the data can be retrieved from the cache memory rather than retrieving the original data from the system memory. As the cache memory can be accessed more quickly than the system memory, this scheme generally increases the overall speed of data retrieval.

To implement caching techniques, processor circuitry typically includes an internal cache memory which is located physically closer to the CPU than the system memory, so can be accessed more quickly than the system memory. When the processor requests data from the system memory a copy of the retrieved data is stored in the cache memory, if it is not stored there already. Some systems provide two or more caches arranged between the CPU and the system memory in a hierarchical structure. Caches further up the hierarchy are typically smaller in size, but can be accessed more quickly by the CPU than caches lower down the hierarchy. Caches within such a structure are usually referred to as level 1 (L1), level 2 (L2), level 3 (L3), . . . caches with the L1 cache usually being the smallest and fastest.

A typical cache memory comprises a series of cache lines, each storing a predetermined sized portion of data. For example, a typical cache memory is divided into 1024 cache lines, each 32 bytes in size, giving a total capacity of 32 kB. Data is usually cached in portions equal to the size of a whole number of cache lines. When an item of data smaller than a cache line is cached, a block of data equal to the size of one or more cache lines containing the data item is cached. For example, the data item may be located at the beginning of the cache line sized portion of data, at the end or somewhere in the middle. Such an approach can improve the efficiency of data accesses exploiting a principle known as spatial locality. The principle of spatial locality means that addresses referenced by programs in a short space of time are likely to span a relatively small portion of the entire address space. By caching one or more entire cache lines, not only is the requested data item cached, but also data located nearby, which, by the principle of spatial locality is more likely to be required in the near future than other data.

Each cache line of the cache memory is associated with address information, known as tags, identifying the region of the system memory from which the data stored in each cache line was retrieved. For example, the tag associated with a particular cache line may comprise the address of the system memory from which the cache line sized portion of data stored in that cache line was retrieved. The cache lines may be stored in a data memory portion of the cache, while the tags may be stored in a tag memory portion of the cache.

When a processor requests data from the system memory, the address of the requested data is first compared to the address information in the tag memory to determine whether a copy of the requested data is already located in the cache as the result of a previous data access. If so, a cache hit occurs and the copy of the data is retrieved from the cache. If not, a cache miss occurs, in which case the data is retrieved from the system memory. In addition, a copy of the retrieved data may be stored in the cache in one or more selected cache lines and the associated tags updated accordingly. In a system comprising a cache hierarchy, when data is requested from the system memory, the highest level cache is first checked to determine if a copy of the data is located there. If not, then the next highest level cache is checked, and so on, until the lowest level cache has been checked. If the data is not located in any of the caches then the data is retrieved from the system memory. A copy of the retrieved data may be stored in any of the caches in the hierarchy.

When applying caching techniques, it is important to ensure that the data stored in a cache represents a true copy of the corresponding data stored in the system memory. This requirement may be referred to as maintaining coherency between the data stored in the system memory and the data stored in the cache. Data coherency may be destroyed, for example, if data in one of the system memory and cache is modified or replaced without modifying or replacing the corresponding data in the other. For example, when the processor wishes to modify data, a copy of which is stored in the cache, the processor will typically modify the cached copy without modifying the original data stored in the system memory. This is because it is the cached copy of the data that the processor would retrieve in future accesses and so, for efficiency reasons, the original data stored in the system memory is not modified. However, without taking steps to maintain coherency, any other devices which access the data from the system memory would access the unmodified, and therefore out of date, data.

Various techniques may be applied to maintain data coherency in cache memory systems. For example, one process, referred to as write-back or copy-back, involves writing or copying data stored in one or more cache lines back to the region of system memory from which the cache lines were originally retrieved (as specified in the address information). This process may be performed in a variety of circumstances. For example, when data stored in a cache line has been modified, the cache line may be copied back to the system memory to ensure that the data stored in the cache line and the corresponding data in the system memory are identical. In another example, when data is copied into the cache as a result of a cache miss, an existing cache line of data may need to be removed to make space for the new entry. This process is known as eviction and the cache line of data that needs to be removed is known as the victim. If the victim comprises modified data, then the victim would need to be written back to the system memory to ensure that the modifications made to the data are not lost when the victim is deleted from the cache.

In some systems, special data coherency routines implemented in software are executed to maintain data coherency. Such routines may periodically sweep the cache to ensure that data coherency is maintained, or may act only when specifically required, for example when data is modified or replaced. These routines may include write-back or copy-back processes.

Some systems employ a technique known as data pre-fetching in which data may be retrieved, possibly speculatively, before it is actually needed in order to increase the overall speed of memory access. Data pre-fetches may be speculative in the sense that the pre-fetched data may not eventually be required. In one example of data pre-fetching, when executing a code loop in which an item of data needs to be retrieved within each iteration of the loop, the data required for a particular iteration may be pre-fetched during the preceding iteration. In this way, at the point the data is actually required, it does not need to be retrieved at that time. In another example, in highly integrated multimedia systems, very large quantities of data are manipulated, typically in a linear fashion, in a technique known as data streaming. In such applications, the future access patterns of data may be known some time in advance. In this case, data required in the future may be pre-fetched so that it is immediately available when eventually required.

Typically, pre-fetched data is stored in a cache and treated as cached data. In this way, when the pre-fetched data is actually requested, the cache will be checked to determine whether the requested data is located there. Due to the earlier data pre-fetch, a copy of the data can be retrieved from the cache, rather than accessing the system memory. Pre-fetching data into a cache is useful even in applications involving data accesses where the property of temporal locality do not apply. For example, in data streaming applications, data may only be used a single time, so temporal locality does not apply in this case. However, for the reasons given above caching pre-fetched data is advantageous.

Mary processor architectures provide special pre-fetch instructions which allow software to cause data to be pre-fetched into a cache in advance of its use. Examples of such instructions include pre-fetch, preload or touch instructions. In such cases a cache normally communicate via a special interface which allows the cache to perform actions when a special instruction is executed by the processor. Data may be pre-fetched into any cache present in a cache hierarchy, such as a level 1 cache or level 2 cache. In some systems, pre-fetching data into a level 2 cache may be performed as a consequence of issuing a request to pre-fetch data into the level 1 cache.

One problem with existing systems is that when data is pre-fetched and stored in a cache, there may be some circumstances when the pre-fetched data is deleted from the cache before it is actually used. For example, as described above, if a portion of data needs to be written to the cache and there is insufficient space in the cache for the data, one or more existing cache lines may need to be removed or evicted to make space for the new data. In some cases, some of the data that is removed may comprise previously pre-fetched data. Since pre-fetched data is stored in the cache before it is actually required, there is a period between initially storing the data and its eventual use during which the pre-fetched data is stored in the cache but has not yet been used. During this period, there is a chance that the pre-fetched data will be evicted from the cache to make space for new data before the pre-fetched data is used. This problem is exacerbated in systems in which pre-fetched data stored in the cache is considered as lower priority data than other cached data and so is evicted first.

Under these circumstances, the pre-fetch operation that originally caused the data to be stored in the cache is wasted. Furthermore, if the evicted pre-fetched data is requested in the future, then it would need to be retrieved from the system memory at that time rather than being retrieved from the cache, resulting in greater memory latency and negating the benefits gained by the pre-fetch mechanism. In general, reduced efficiency of memory access and increased system overhead is the result.

SUMMARY

The present invention solves these and other problems associated with existing techniques.

According to a first aspect, the present disclosure provides a cache memory system for caching data comprising: a cache memory for storing a copy of a portion of data stored in a system memory; and a cache load circuit capable of retrieving the portion of data from the system memory, of selecting a region of the cache memory in which to store the retrieved portion of data, and of storing a copy of the retrieved portion of data in the selected region of the cache memory; wherein the system further comprises: means for identifying whether or not a region of the cache memory contains data that has been accessed from the cache memory by an external device; the cache load circuit being arranged such that the region of the cache memory selected for storing the retrieved portion of data is a vacant region or a region identified as containing data that has been accessed by an external device, in preference to a region identified as containing data that has not been accessed by an external device.

According to a second aspect, the present disclosure provides a method for caching data in a cache memory system, the method comprising the steps of: retrieving a portion of data from a system memory; selecting a region of a cache memory in which to store a copy of the retrieved portion of data; and storing a copy of the retrieved portion of data in the selected region of the cache memory; wherein the method comprises the further step of: identifying whether or not a region of the cache memory contains data that has been accessed from the cache memory by an external device; in which the step of selecting a region comprises the step of selecting a region of the cache memory that is a vacant region or a region identified as containing data that has been accessed by an external device, in preference to a region identified as containing data that has not been accessed by an external device.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
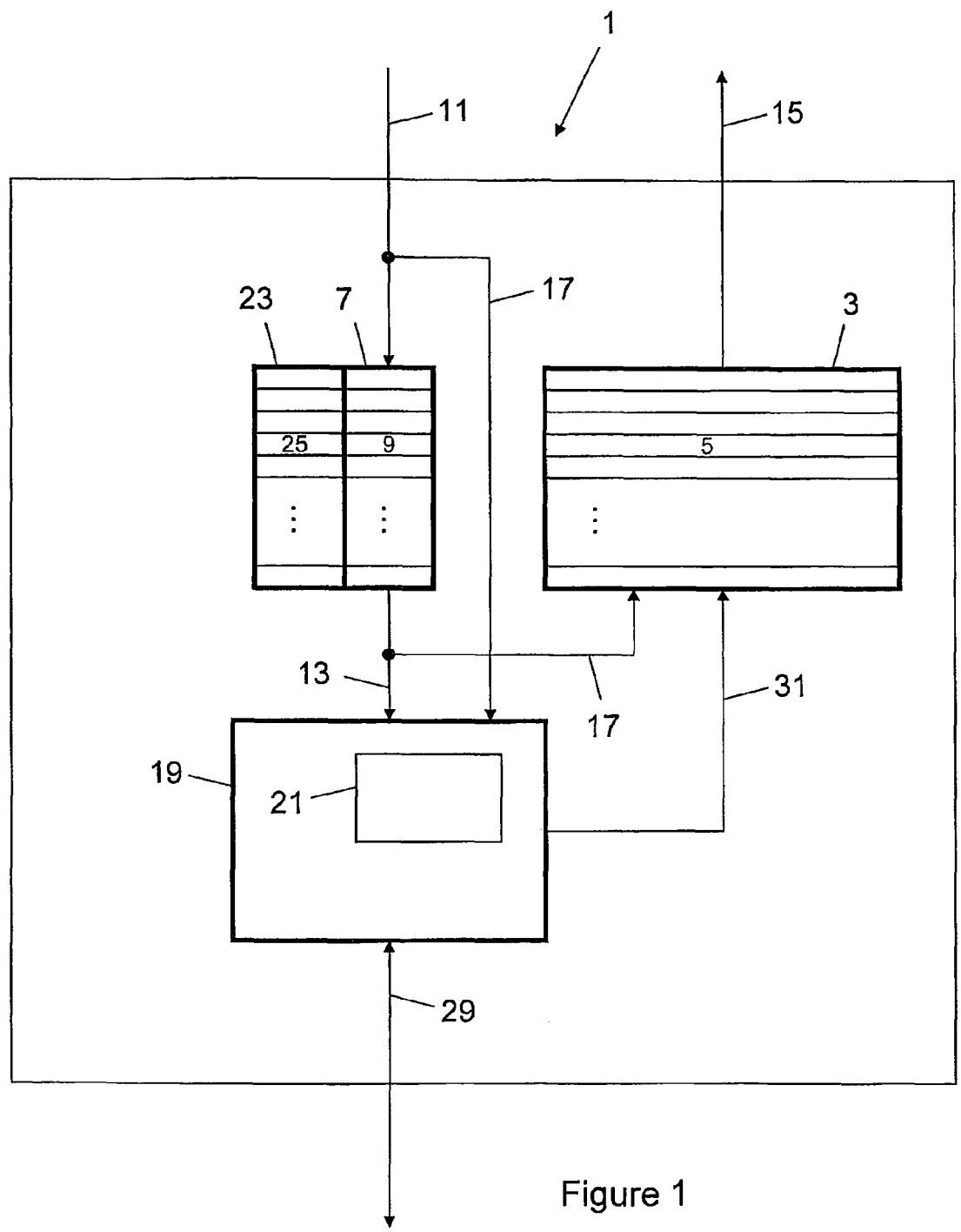
FIG. 1 is a schematic diagram of a cache memory system in a first embodiment of the invention.

FIG. 1 is a schematic diagram of an exemplary cache memory system embodying the present disclosure. The system, referred to below simply as cache 1, comprises a data memory 3 for storing one or more cache lines 5 of data and a tag memory 7 for storing address information in the form of a series of tags 9. For each cache line 5 in the data memory 3, there is a corresponding tag 9 in the tag memory 7. The cache 1 also comprises a cache load circuit 19 used to store data in the data memory 3. It is understood that the present disclosure may be used in a variety of cache systems and is not limited to the arrangement illustrated in FIG. 1.

Figure 2:
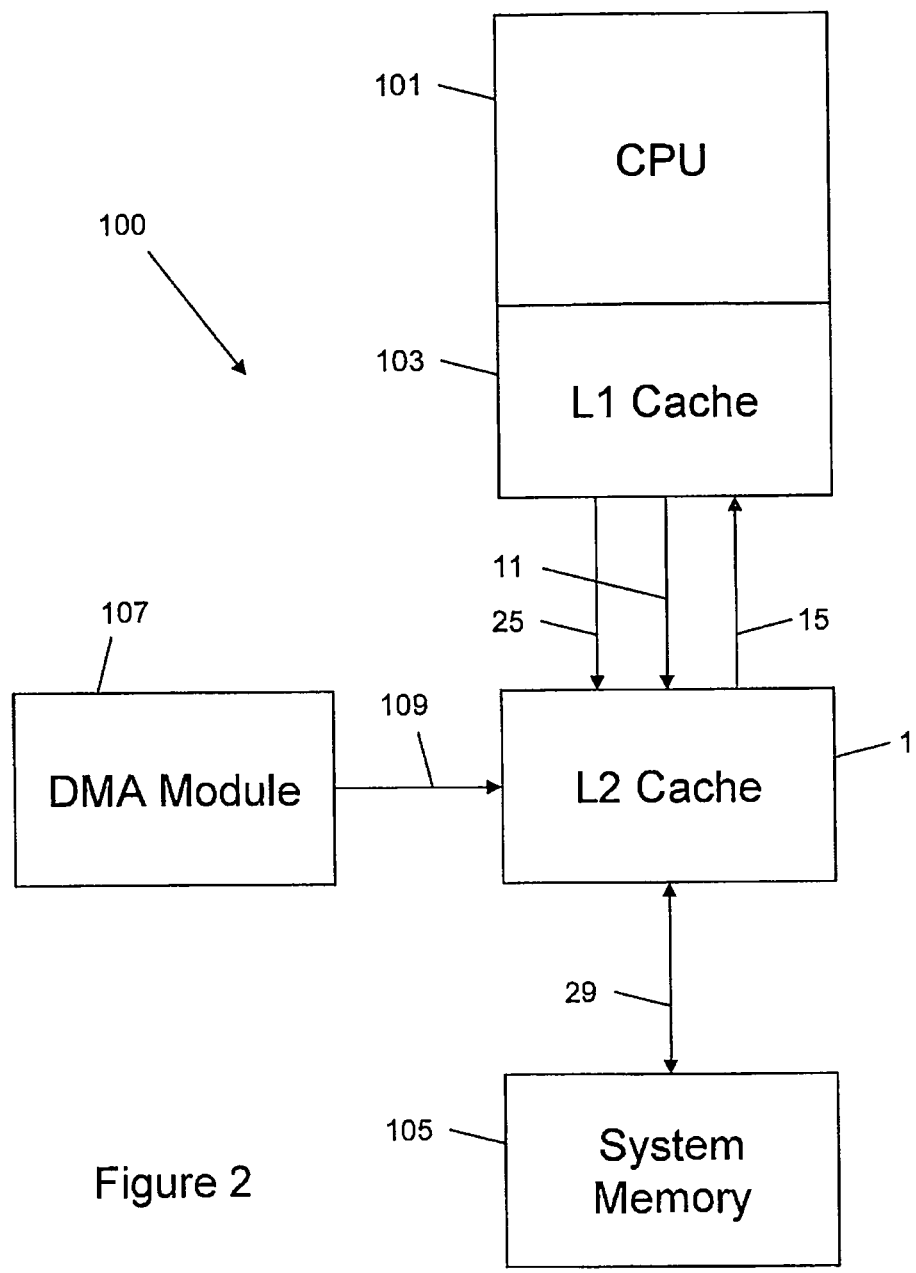
FIG. 2 is a schematic diagram of a system comprising the cache shown in FIG. 1.

FIG. 2 illustrates a system 100 comprising the cache 1 shown in FIG. 1. As shown in FIG. 2, in this embodiment, the cache 1 is a level 2 cache functionally located between a processor 101 comprising a level 1 cache 103 and a system memory 105. However, it is understood that the cache shown in FIG. 1 may be used as any level of cache, in any cache hierarchy arrangement or as a sole cache. The term system memory may refer to a specific memory device or to a group of two or more memory devices. In general the system memory represents a general memory space formed from the whole, or part of, the individual memory spaces of one or more memory devices. The processor 101 directly accesses the level 1 cache 103. The level 1 cache 103 communicates with the level 2 cache 1 via bus lines 11, 15 and 25 and the level 2 cache 1 communicates with the system memory 105 via bus line 29. The system 100 also comprises other modules, including a module 107 having DMA (Direct Memory Access) capability. The module 107 accesses the level 2 cache 1 via bus line 109. Other parts of the system (not shown) may also access the level 2 cache 1 via further bus lines (not shown), which may be separate from or integrated with bus line 109.

With reference to FIG. 2, when the processor 101 issues a request for retrieval of data stored in the system memory 105 the following process occurs. First, the data access request is transmitted to the level 1 cache 103 which determines whether it stores a copy of the requested data. If so then the copy of the requested data is retrieved from the level 1 cache 103 and provided to the processor 101. In this case, no data retrieval involving the level 2 cache 1 or the system memory 105 is made. If the level 1 cache 103 does not store a copy of the requested data then the data access request is forwarded from the level 1 cache 103 to the level 2 cache 1. In this case, the level 2 cache 1 determines whether it stores a copy of the requested data. If so then the copy of the requested data is retrieved from the level 2 cache 1 and provided to the level 1 cache 103, which in turn provides the data to the processor 101. If the level 2 cache 1 does not store a copy of the requested data then the data is retrieved from the system memory 105. In this case, the level 2 cache 1 requests the data from the system memory 105 and provides the retrieved data to the level 1 cache 103, which in turn provides it to the processor 101.

With reference to FIG. 1, the level 2 cache 1 performs the following process when a data access request is received by it. First, a determination is made as to whether a copy of the data specified in the data access request is already present in the data memory 3 of the cache 1. The data access request identifies the address of the system memory 105 at which the requested data is located. The address of the requested data is supplied to the tag memory 7 via line 11 and compared to the tags 9 stored in the tag memory 7. Each tag 9 comprises an address of the system memory 105 from which a corresponding cache line 5 of data was originally retrieved. If the address of the data presently being requested matches an address specified by a tag 9, this indicates that the data memory 3 does contain a copy of the requested data. A match is indicated by asserting a hit signal on line 13, which is received by the data memory 3 and the cache load circuit 19. When the hit signal is asserted, the cache line 5 of data corresponding to the tag 9 causing the hit is retrieved from the data memory 3 and output from the data memory 3 and cache 1 on line 15.

If no match is found between the address of the requested data and any of the tags 9 in the tag memory, the hit signal is not asserted. In this case the requested data is retrieved from the system memory 105 using the cache load circuit 19 in the manner described below. A copy of the data retrieved from the system memory 105 by the cache load circuit is stored in the data memory 3. The data is then output from the data memory 3 and cache 1 on line 15.

The cache load circuit 19 comprises a memory 21 which stores a queue of pending cache load operations. Each cache load operation represents an item of data to be retrieved from the system memory 105 and includes the memory address of the data item. A cache load operation may also contain other relevant information, such as whether the data is required as the result of a pre-fetch or some other type of data access. The address received on line 11 is provided to the cache load circuit 19 via line 17. As mentioned above, the cache load circuit 19 also receives the hit signal via line 13. When the hit signal on line 13 is not asserted, the cache load circuit 19 adds a cache load operation to the queue stored in the memory 21 based on the address received on line 17. The cache load circuit 19 processes each cache load operation in turn, for example in the order in which they were added to the queue. A newly added cache load operation will eventually be processed by the cache load circuit resulting in the data being retrieved from the system memory 105, stored in the data memory 3 and output from the cache 1.

To process a cache load operation, the cache load circuit identifies the address of the data to be cached and issues a suitable data access request on line 29 which is received by the system memory 105. When the requested data is provided back to the cache load circuit, the cache load circuit identifies one or more suitable cache lines in the data memory in which to store the received data. These may comprise currently vacant cache lines. However, if there are insufficient free cache lines, it may be necessary to remove one or more existing cache lines of data to make room for the new data, in which case the write-back process described above may be required. The cache load circuit then transmits a load command to the data memory via line 31 comprising a copy of data to be cached, the system memory address from which the data was retrieved and the cache lines identified to store the data. The copy of the data is then stored in the cache lines specified in the load command and corresponding tags are added to the tag memory based on the address information specified in the load command.

The present disclosure provides a system and method which can ensure that pre-fetched data is not evicted from the cache memory unless it has already been used. In order to achieve this, the cache memory system further comprises a status memory 23 for storing a series of status values 25. For each cache line in the data memory, there is an associated status value in the status memory, where each status value indicates whether the corresponding cache line of data has been used. Data may be considered to have been used for example if the data has been accessed directly or indirectly from the cache by an external device. An external device is one that is external to the cache memory system, including a processor (of which the cache memory system may be a part) or module with DMA (Direct Memory Access) capability. For example, if, when a device requests data, the data is retrieved from the system memory and transmitted to the device, while at the same time a copy of the requested data is stored in the cache, then the cached copy of the data may be regarded as having been used. On the other hand, if data is stored in the cache as the result of a pre-fetch, but the data is not supplied to an external device then the pre-fetched data stored in the cache may be regarded as having not been used, unless and until the data is supplied to an external device, for example as the result of a data request.

In one embodiment, each status value comprises a one bit flag whose state can be set to one of two states (for example 1 and 0) depending on whether or not the data in the corresponding cache line has been used or not. The status memory in the embodiment illustrated in FIG. 1 comprises an N bit register, each bit being individually modifiable and corresponding to one of the N status flags 24. In alternative embodiments, the status memory may be formed of dedicated or defined regions of a shared memory or other memory. For example, the status memory and the tag memory described above may be combined so that the status values are provided as an augmentation of each tag element 9 in the tag memory 7. Other means and arrangements to specify the status values are also possible.

The status values stored in the status memory are set when a portion of data is initially stored in the data memory, and subsequently modified as necessary. For example, when a cache miss occurs as a result of a data request by an external device, the requested data is retrieved from the system memory. The data is then transmitted to the requesting device and a copy of the data is stored in one or more cache lines of the data memory. In this case, the data stored in these cache lines is used immediately (by the requesting device) and so the status values corresponding to the cache lines in which a copy of the data is stored are each initialised with a first value (such as 0). This indicates that the data stored in these cache lines has been used.

As mentioned above, when data is pre-fetched, the pre-fetched data is stored in the data memory in advance of its use, and so at the time the data is stored, is has not yet been used. Accordingly, when pre-fetched data is stored in one or more cache lines of the data memory, the status values corresponding to these cache lines are each initialised with a second value (such as 1). This indicates that the data stored in these cache lines has not been used.

If, as a result of a data request from an external device, an address is looked up in the tag memory and a cache hit occurs, the corresponding cache lines of data are supplied to the device requesting the data for use. In this case, the status values corresponding to those cache lines are each set to the first value if they do not have that value already, thereby indicating that the data stored in those cache lines have been used. This may occur for example, when data that was previously pre-fetched is actually required.

As described above, when a copy of data is initially stored in the data memory, the cache load circuit must identify one or more cache lines in which to store the data. If there are insufficient free cache lines to store the data then one or more existing cache lines of data may need to be evicted to make space for the new data. In this case, the data stored in those cache lines whose corresponding status values are set to the first value (indicating that the data has been used) is evicted in preference to data stored in those cache lines whose corresponding status value is set to the second value (indicating that the data has not been used). In this way, the data that is stored in the cache but which has not yet been used is retained in the cache while data that has already been used is evicted first. In one embodiment, data stored in one or more cache lines is never evicted while the status value corresponding to those cache lines have the second value (indicating that the data has not been used). In this case, if there are no or insufficient numbers of cache lines containing used data to accommodate the new data, then some or all of the new data is not stored in the cache.

Under these circumstances, the new data would not be cached, meaning that if it were required again in the future it would need to be retrieved from the system memory. However, this is balanced by the fact that unused data already stored in the cache would not be evicted, thereby avoiding a wasted caching operation previously performed to cache the unused data. In many cases, there would be sufficient free cache lines and cache lines containing used data to cache the new data without any wasted caching operations or data accesses. By minimising the number of caching operations and data accesses, the present present disclosure increases the overall efficiency of data access.

Figure 3:
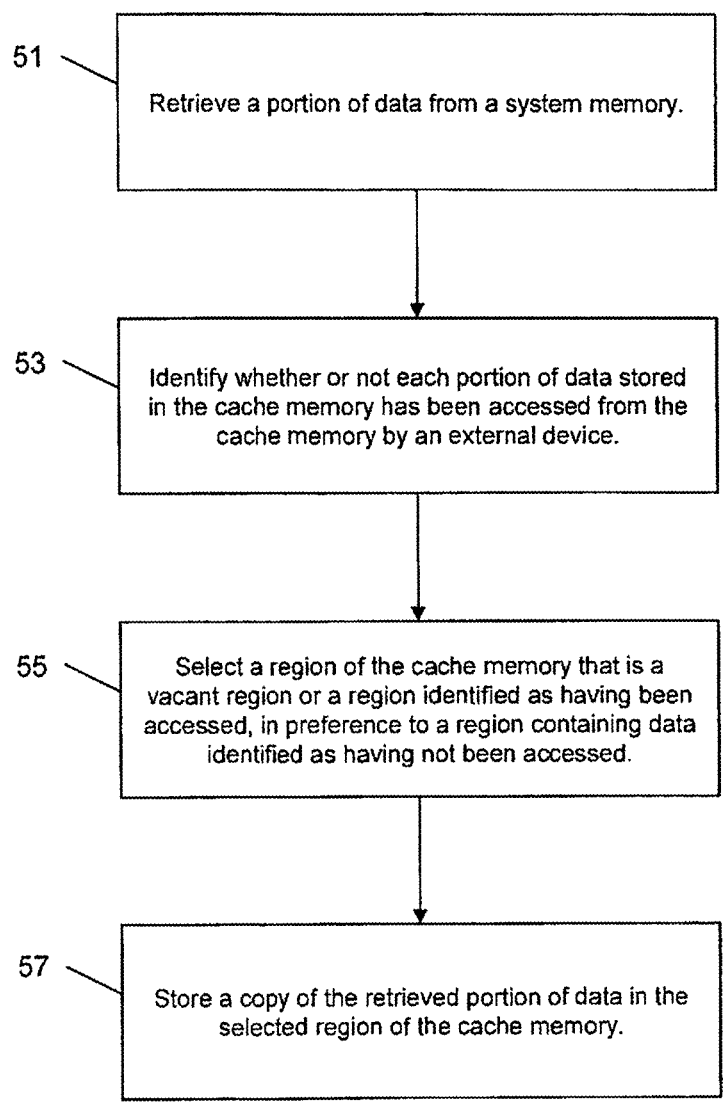
FIG. 3 is a flow diagram of a method according to the invention.

FIG. 3 is a flow diagram of a method according to the present disclosure. In a first step 51 a portion of data is retrieved from the system memory. Next, a region of the cache memory in which to store the retrieved portion of data is selected. Accordingly, in a next step 53, an identification is made as to whether or not each portion of data stored in the cache memory has been accessed from the cache memory by an external device. In a next step 55, a region of the cache memory is selected that is a vacant region or a region identified as having been accessed, in preference to a region containing data identified as having not been accessed. In a next step 57, a copy of the retrieved portion of data is stored in the selected region of the cache memory.

In some cases, if certain pre-fetched data is evicted from the cache before it has been used. For example, it may be unimportant in some cases if data that has been pre-fetched from outside certain memory ranges is evicted from the cache before being used. Even if this is the case, it may still be required or at least desirable to ensure that other data, such as data pre-fetched from inside the memory ranges is not evicted from the cache before being used. In these cases, the following modifications may be made to the embodiments described above.

In one possible modification, when data is first loaded into the cache, the status values associated with those cache lines selected to store particular pre-fetched data are initially set to indicate that the data has already been accessed from the cache. This process is applied only for pre-fetched data which does not require protection from eviction before it has been accessed from the cache. Such data may comprise data having certain characteristics, properties or attributes, or which satisfies certain conditions. For example, the process may be applied for pre-fetched data that has been pre-fetched from inside or outside one or more defined memory ranges. By initially setting the status values in this way, the system will treat this particular pre-fetched data (but not necessarily other data) as having been used, even though in reality it may have not been. The system is thus able to consider this particular data as a candidate for eviction in the event that space is required for subsequently cached data.

When a portion of data is pre-fetched and stored in the cache, a determination is made as to whether that data needs to be protected from eviction or not. For example, the address from which the data was pre-fetched may be compared with certain defined address ranges. If the address falls outside one of the defined ranges then the status values associated with those cache lines selected to store the data are initially set to indicate that the data has been used. In this way data pre-fetched from outside the defined ranges is not protected from eviction, whereas data pre-fetched from inside the memory ranges is protected. The address ranges may be defined, for example, by information stored in a memory, and may be fixed or modifiable.

In a variation, rather than modifying the way in which the status values are initially set, instead the way in which the cache load circuit selects cache lines to store pre-fetched data is modified. In this variation, when any pre-fetched data is first stored in the cache, the status values associated with the cache lines selected to store the data are initially set to indicate that the data has not been used (as in the first described embodiments). However, when the cache load circuit is subsequently required to select one or more cache lines for eviction purposes, the cache load circuit examines not only the status values, but also the address information in the tag memory indicating from which address data was fetched. If a status value associated with a cache line indicates that the data stored in that cache line has not been used, the cache load circuit can nevertheless consider this particular data as a candidate for eviction if the associated tag indicates that the data was fetched from outside one or more defined address ranges.

In another possible modification, only some, and not all, of the cache lines are associated with a status value. Data which requires protection from eviction are stored in cache lines having associated status values while data not requiring protection from eviction is stored in cache lines not having associated status values. Cache lines not having associated status values may be treated by the cache load circuit the same as cache lines having status values indicating that the data stored therein has been used.

These modifications may be thought of as selectively applying the techniques of the present disclosure, or not, depending on the characteristics, properties or attributes of data or whether certain conditions are satisfied or not. This includes the address from which data was retrieved. However, in each case, it is understood that properties, attributes or characteristics other than the address of data may be used to determine whether to apply the techniques described above.

A further embodiment of the present disclosure will now be described with reference to FIGS. 4 to 9. In broad terms, in this embodiment there is provided a cache memory comprising: a first storage means comprising a plurality of data storage locations; a second storage means comprising a plurality of status information storage locations corresponding to the data storage locations; a control means arranged to detect a pre-fetch operation resulting in data being stored in one of the data storage locations of the first storage means, and, responsive thereto, store a first value in the corresponding status information storage location, wherein the cache memory is prevented from storing data in a given data storage location if the corresponding status information storage location has the first value.

As mentioned above, a disadvantage of known systems is that data pre-fetched into the cache can be overwritten by further lines being written into the cache, for example due to a cache miss from the CPU. This can occur if the data is fetched a long time before its intended use, or if the cache is direct-mapped or of low-associativity. This can also occur if there is a random replacement policy which means that any fetched line is vulnerable to replacement at any time, or if the particular algorithm being computed means that there is a set of address clashes which prevent the co-existence in the cache of two or more data items whose use in the program is temporally close.

FIGS. 4 to 8 illustrate a system comprising a level 2 cache. FIG. 9 illustrates a further embodiment of the present disclosure.

Figure 5:
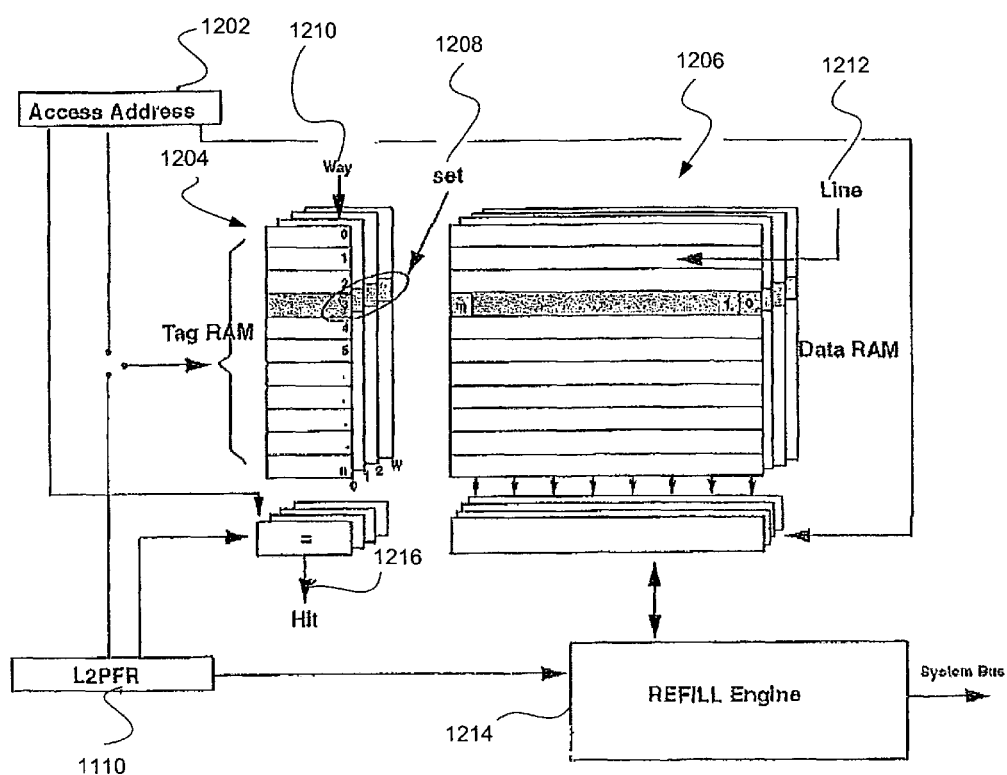
FIG. 5 shows the internal structure of a level 2 cache.

In the system shown in FIG. 5, the level 2 (L2) cache has a target port dedicated to accessing a special register called an L2PFR (L2 pre-fetch register). The use of this register allows CPU and non-CPU requesters to cause data to be fetched into the L2 cache before it is used, therefore avoiding having to suffer the delay incurred when the CPU fetches on demand.

The L2PFR may be implemented as a 32-bit write-only register. Writing a 32-bit value to this register may cause the naturally-aligned 32-byte block—whose address is specified by bits [31:5] of the value—to be fetched into the L2 cache. The pre-fetch operation can therefore be initiated by a CPU with a standard word write operation.

The procedure followed is that first the address is looked up in the L2 cache. If there is a hit, that is the 32-byte block associated with the address is present in the cache, then there is no further activity and no data is fetched. If there is a miss, which implies that the data is not in the cache then space is allocated in the cache and the 32-byte block is fetched from main memory and placed in the level 2 cache. This pre-fetch mechanism is therefore simple to use within the structure of conventional software and conventional DMA engines.

A common use is when a data buffer is to be transferred from an I/O interface to main memory whereupon the CPU will perform some computation on the data contained in the buffer. In a conventional system a DMA engine maybe deployed to transfer data from an I/O interface (e.g. an Ethernet port, a USB port, a SATA disk interface etc.) into system dynamic random access memory (DRAM). Upon completion of the data transfer the DMA engine would send an interrupt to the CPU to signal that the data is transfer has finished. The interrupt handler in the CPU would schedule the execution of an appropriate routine to deal with the computation to be performed on the data buffer.

The routine may then execute in an expedited manner by using one of two methods:

1). A linked list which specifies the set of transfers to be performed by the DMA is extended by one or more additional items. The first additional item specifies that a single 32-bit datum is to be transferred from system memory to the address of the L2PFR register. The value of the datum is the address of the first byte of the data buffer which has been transferred. Optionally, subsequent additional items are similar except that the value of the datum transferred to the L2PFR register is numerically 32 larger than the previous item. If n additional items were specified (where $1 \leq n \leq$(buffer size/32)) then this has the effect of pre-fetching some or all of the data buffer into the L2 cache.

2). The transfer proceeds as in a conventional system and an interrupt is sent to the CPU on completion of the DMA. In addition to the conventional actions the interrupt handler writes the address of one or more blocks which contain the data buffer to the L2PFR register. This causes some or all of the data buffer to be requested to be pre-fetched into the L2 cache before the computation routine associated with the data buffer is executed.

Figure 4:
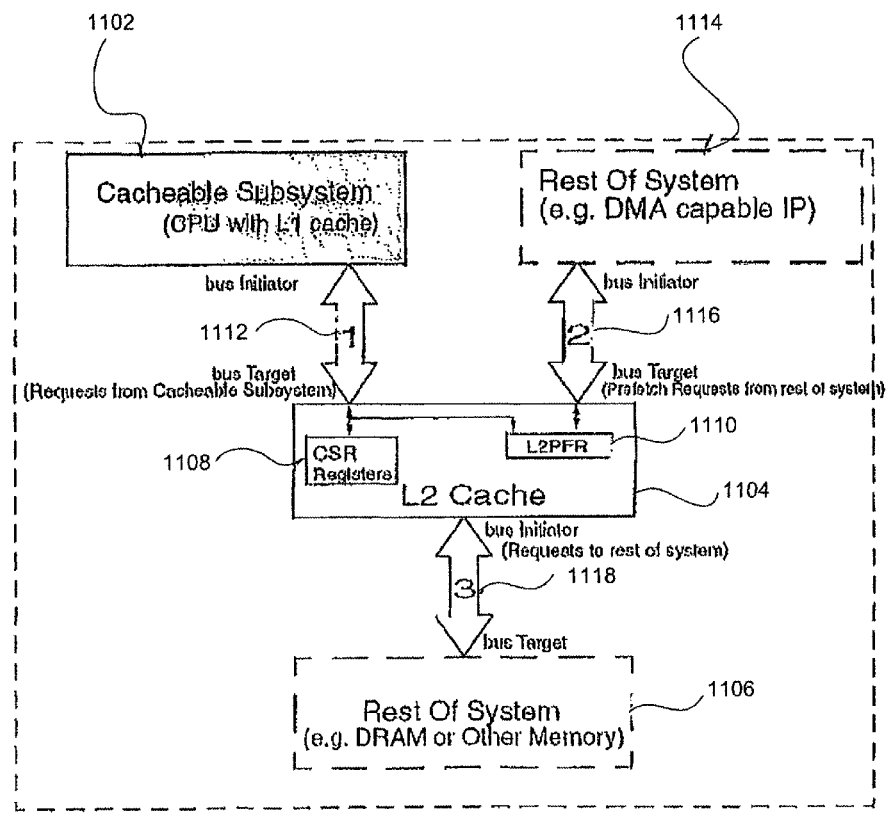
FIG. 4 shows a system topology comprising a level 2 cache.

Reference is now made to FIG. 4, which illustrates a hierarchical memory arrangement. In this arrangement a CPU 1102 (which optionally has a level 1 cache) is supplemented by a separate module known as a level 2 cache 1104. Use of the term level 2 should not be taken to imply exclusive use in systems which have level 1 caches. Nor is there an implication that there is no level 3 or higher level caches. Nonetheless, the level 2 terminology is retained purely for simplicity of exposition.

The level 2 cache (L2 cache) 1104 is functionally located between the CPU 1102 and the rest of the system 1106 so that all of its high performance memory requests have to go via the L2 cache 1104. The L2 cache 1104 is able to service some of its requests from its own contents and other requests is passes on to the rest of the system to be serviced. The L2 cache 1104 also contains a number of configuration and status registers (CSRs) 1108 through which the operation of the L2 cache 1104 may be controlled and monitored.

A top-level diagram of a cache such as the L2 cache 1104 is shown in FIG. 5. The cache comprises an access address 1202, which is the address which is presented by the CPU 1102 to the L2 cache 1104, and a tag RAM 1204 which is the memory to which the access address 1202 is associated. In other words the access address 1202 is compared with the contents of the tag RAM 1204 to determine which data RAM 1206 array (line) should be selected. Data RAM 1206 holds the data which is supplied to the L2 cache 1104. In a set-associative cache an address can only reside in a limited number of places in the cache. The collection of places which a single address may reside is called a set 1208. The collection of addresses which are in the same set is called a way 1210. A block of data associated with a single address in the tag RAM 1204 is a line 1212. A refill engine 1214 is present, which is a functional unit whose responsibility is fetching from main memory data which is not already held in the cache. It does this on demand from a standard access or a pre-fetch.

Figure 7:
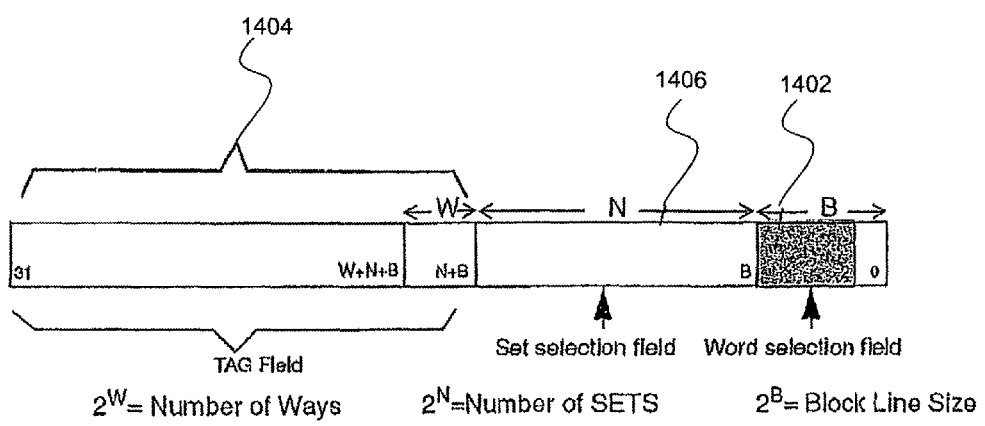
FIG. 7 shows the fields of a 32-bit physical address and how they are interpreted by the L2 cache lookup logic.

As mentioned, this system makes use of a special register called L2PFR 1110, which is an operational register used to initiate a pre-fetch. The L2PFR 1110 is writable by both the CPU 1102 (using the target 1 port 1112) and modules with DMA capability 1114 in the rest of the system (using the target 2 port 1116). When the register is written with a 32-bit operand, the operand is interpreted as a cache line address (see FIG. 7). When an address is submitted to the cache for lookup the address is broken down into a number of fields that are used for different purposes by the hardware. The size and location of each of the fields depends on the size and internal organisation of the cache. An example arrangement of the fields is shown in FIG. 7. A word selection field 1402 specifies which of the 8 4-byte words in the line is the requested word. A tag field 1404 is stored in the tag RAM to uniquely identify the address of the data held in the associated line. A set selection field 1406 is used to determine which set in the cache is looked up.

Figure 6:
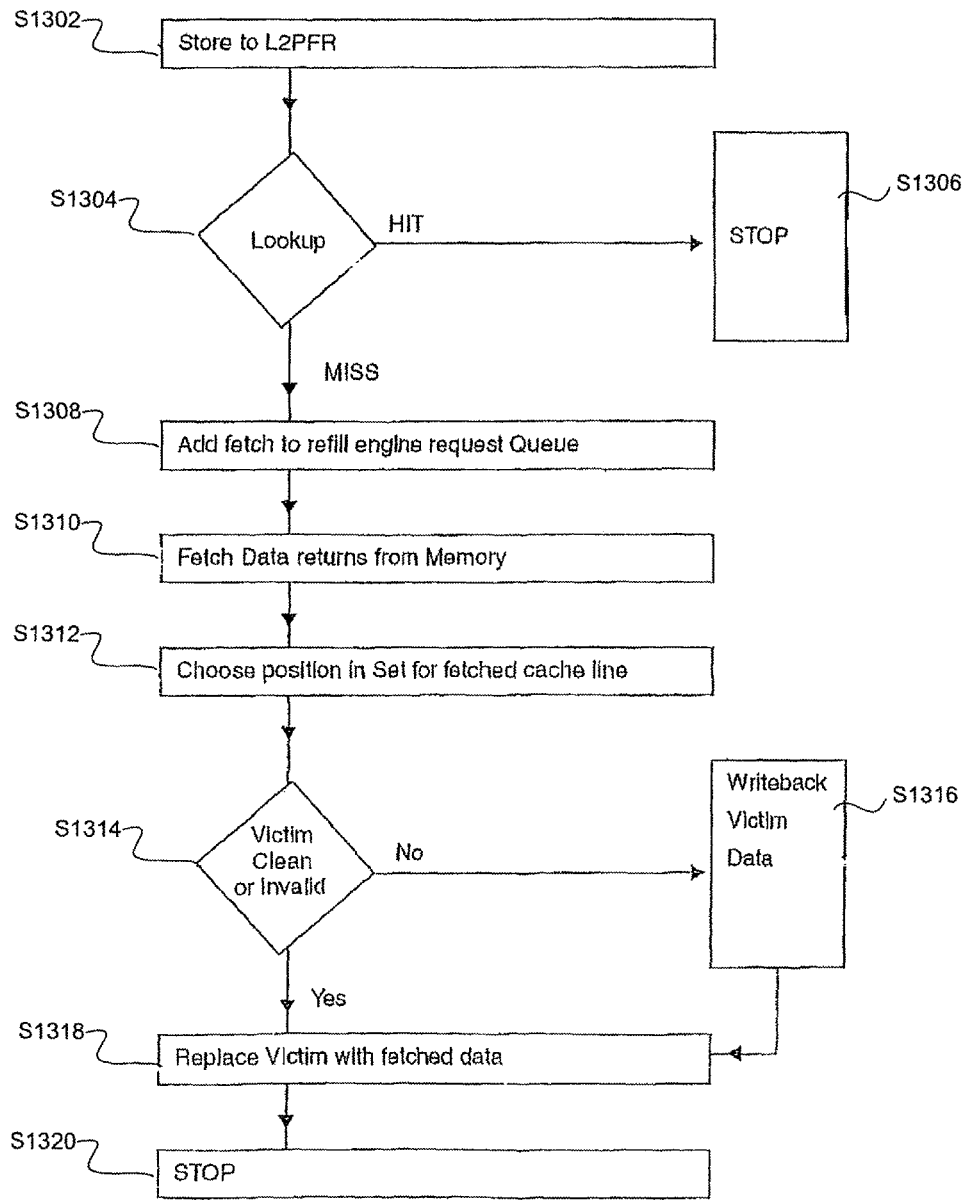
FIG. 6 shows a flow diagram for a pre-fetch procedure.
Figure 8:
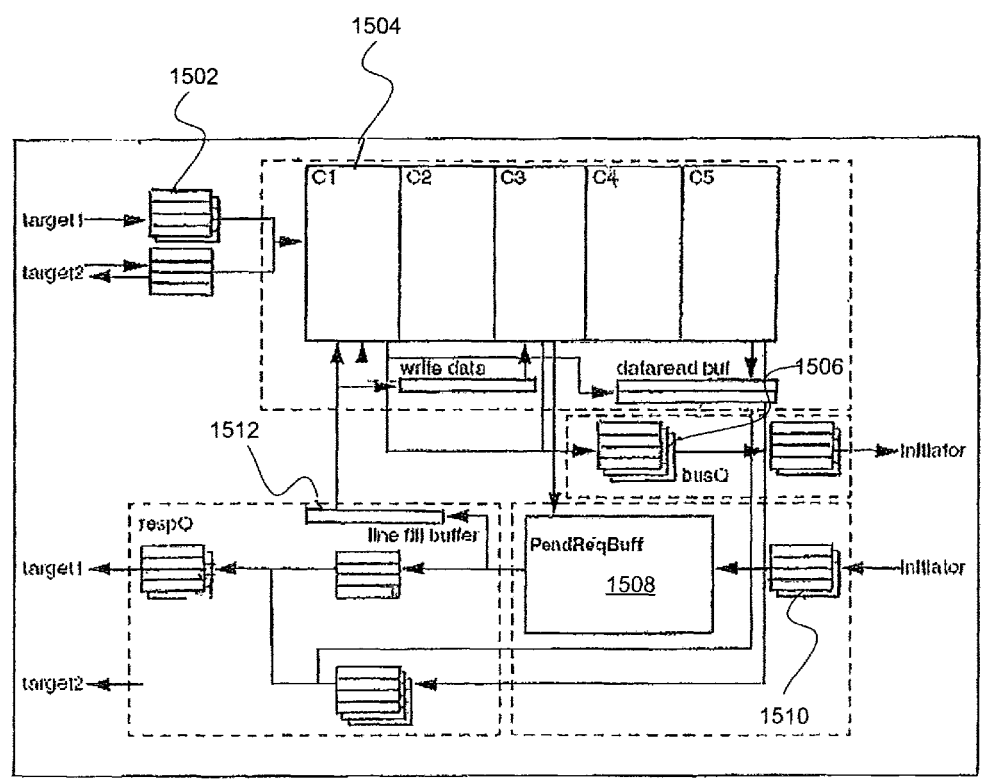
FIG. 8 shows internal buffering and logic for a level 2 cache.
Figure 9:
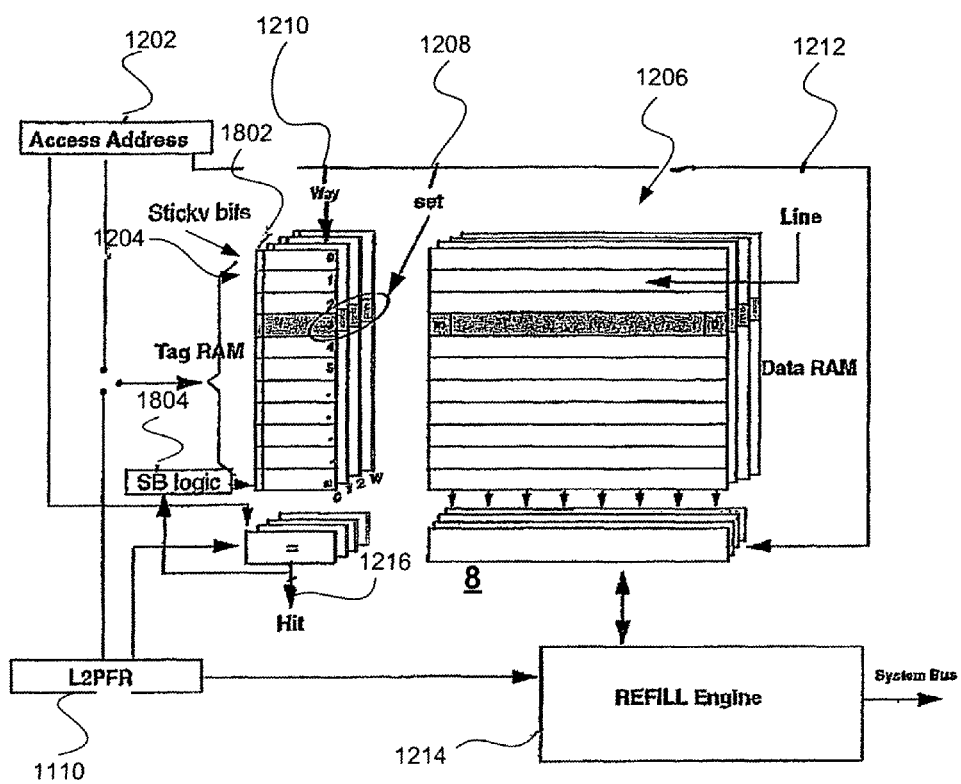
FIG. 9 shows the internal structure of a level 2 cache for a further embodiment.

The procedure following a write to the L2PFR 108 is outlined in the flow diagram in FIG. 6, with further reference to FIG. 8 which illustrates internal logic and buffering of the L2 cache. A write is made into the L2PFR in step S1302. This is interpreted as a request to fetch the address into the L2 cache. The operand is latched into the target 2 incoming buffer in FIG. 8) and transferred to the first part of the control pipeline C1 (1504) whereupon logic signals are generated such that the address is looked-up in the tags (see 1204 of FIG. 6).

A lookup of the L2PFR is made in step S1304. If the lookup of the L2PFR address does yields a match (in step S1306), as indicated by assertion of the "HIT" signal (1216 in FIG. 6) then this indicates that the data is already held in the cache and no further action is taken.

If the lookup of the L2PFR address does not yield a match this is indicated by de-assertion of the HIT signal (1216 in FIG. 6). In this case a fetch request is passed to the refill engine (1214 in FIG. 6) in step S1308. The refill engine ensures that an appropriate entry is added to the bus queue (1506) and also to the Pending request buffer (1508). The Pending request buffer holds address and allocation attributes of all outstanding requests.

Entries in the bus queue (1506) will eventually be realized as memory requests on the system interconnect (1118 in FIG. 4) in a standard manner. The request will eventually illicit a response containing the requested data in step S1310. The requested data is buffered in the response queue (1510). The request attributes contained in the pending request buffer (1508) are used to identify where in the cache the pre-fetched data is to be located and the tag which is to accompany it into the cache (step S1312). The data and tags are loaded into the cache using the line fill buffer (1512).

If the L2 cache is operated in copy-back mode there is a possibility that the place selected for the fetched data was previously occupied by a cache line (the victim) which has been modified since being fetched from memory (i.e. is termed dirty). A dirty victim will require writing back to memory—a process sometimes referred to as eviction. In step S1314 it is checked whether the write-back is needed, and if so, in step S1316 the L2 arranges for the write-back in a manner common to the design of caches and utilizing a write-back buffer to hold the data whose place in the cache will have been taken by the pre-fetched data. In step S1318 the victim is replaced by the fetched data, and, in step S1320, the process halts.

There is also the possibility that the data to be pre-fetched, although not currently present in the cache, is in the process of being fetched into the cache by a preceding data access miss or indeed an earlier pre-fetch. For this reason, in addition to looking up in the TAG array of the cache the pre-fetch address must also search the pending request buffer 1508. If there is a match in the pending request buffer then the pre-fetch request is discarded and no further action is taken.

Data access misses to the L2PFR address which occur when the pre-fetch request is pending will be detected by searching the pending request buffer. The Pending request buffer is able to link together subsequent data accesses, so that when the fetched data returns it is able to be used to satisfy each of these accesses in turn. This functionality is easily implemented in standard logic and is known to the designers of caches which are able to deal with multiple misses.

FIG. 9 illustrates the internal structure of a L2 cache with a buffer pre-fetch scheme of the further embodiment. This embodiment allows data which is pre-fetched into the cache to be immune from conflict eviction until it is next used.

The further embodiment has a similar internal L2 cache structure to that described above and illustrated in FIG. 5. In addition, the tag array 1204 is augmented by each member of the tag array having a "sticky bit" 1802. For all cache lines brought into the L2 cache by a demand miss from a CPU (e.g. an L1 cache miss) the sticky bit of the incoming line will be set to '0' by the refill engine 1214. When the cache line has been fetched into the L2 cache because of a pre-fetch caused by a write to the L2PFR register 1110, then the refill engine 1214 will set the sticky bit to '1'.

When an access is made to the L2 cache which results in an address being looked up and generating a hit 1216 then the associated sticky bit 1802 is cleared to '0' by the sticky bit (SB) logic block 1804. When a cache line needs to be fetched into the cache, the refill engine 1214 is responsible for choosing the location in the cache into which the new line will be placed. In many cases this means that an existing line will have to be removed in order to make room for the new incoming cache line. The refill engine 1214 will never choose a line whose sticky bit is set to '1' for removal in this manner. If all the lines in a set have their sticky bit 1802 set then the refill engine 1214 will not copy the fetched line into the cache otherwise it will choose a line whose tag 'sticky bit' is clear.

It is understood that the features of any of the embodiment described above may be used in any of the other embodiments, where this is possible and appropriate.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims

What is claimed is:

1. A cache memory system for caching data, comprising:
a cache memory configured to store a copy of a portion of data stored in a system memory;
a cache load circuit configured to retrieve the portion of data from the system memory, select a region from a plurality of regions of the cache memory in which to store the retrieved portion of data, and store a copy of the retrieved portion of data in the selected region of the cache memory;
a tag memory configured to store address information identifying a region of the system memory from which the portion of data stored in the cache memory was retrieved; and
a status memory configured to identify whether a region of the cache memory contains data that has been accessed from the cache memory by a device external to the cache memory system,
wherein the plurality of regions of the cache memory from which the cache load circuit is configured to select comprises (i) a vacant region, (ii) a region identified as containing data that has been accessed by the device external to the cache memory system, and (iii) a region identified as containing data that has not been accessed by the device external to the cache memory system, and
wherein the region of the system memory from which the data was retrieved is outside one or more defined address ranges of system memory.

2. The cache memory system according to claim 1, wherein the cache load circuit is configured to select the region of the cache memory in which to store the retrieved portion of data according to at least one status value located in status memory.

3. The cache memory system according to claim 2, wherein if a region of the cache memory cannot be selected for storing the retrieved portion of data, the cache load circuit is arranged to not store the retrieved portion of data in the cache memory.

4. The cache memory system according to claim 1, wherein the cache memory comprises one or more cache lines, each cache line being arranged to store a copy of a portion of data retrieved from a region of the system memory.

5. The cache memory system according to claim 4, wherein the status memory comprises a series of status values, each cache line being associated with a status value, each status value being set to a first value if the data stored in the corresponding cache line has been accessed by the device external to the cache memory system and set to a second value if the data stored in the corresponding cache line has not been accessed by the device external to the cache memory system.

6. The cache memory system according to claim 5, wherein the status value corresponding to a first cache line is set to the second value when data is initially stored in the first cache line as a result of a data pre-fetch.

7. The cache memory system according to claim 6, wherein the status value corresponding to the first cache line is set to the first value when data stored in the first cache line is accessed.

8. The cache memory system according to claim 5, wherein the status value corresponding to a second cache line is set to the first value when data is stored in the second cache line as a result of a data request.

9. The cache memory system according to claim 8, wherein the status memory stores a status value for each cache line.

10. The cache memory system according to claim 9, wherein the status values comprise an augmentation of the address information.

11. The cache memory system according to claim 1, wherein the cache memory system is part of a level 2 cache.

12. An integrated circuit comprising a cache memory system according to claim 1.

13. A system, comprising:
a processor;
a system memory;
a cache memory configured to store a copy of a portion of data stored in a system memory;
a cache load circuit configured to retrieve the portion of data from the system memory, select a region from a plurality of regions of the cache memory in which to store the retrieved portion of data, and store a copy of the retrieved portion of data in the selected region of the cache memory located in between the processor and the system memory;
a tag memory configured to store address information identifying a region of the system memory from which the portion of data stored in the cache memory was retrieved; and
a status memory configured to identify whether a region of the cache memory contains data that has been accessed from the cache memory by a device external to the cache memory system,
wherein the plurality of regions of the cache memory from which the cache load circuit is configured to select comprises (i) a vacant region, (ii) a region identified as containing data that has been accessed by the device external to the cache memory system, and (iii) a region identified as containing data that has not been accessed by the device external to the cache memory system, and wherein the region of the system memory from which the data was retrieved is outside one or more defined address ranges of system memory.

14. A method for caching data in a cache memory system, the method comprising:

retrieving a portion of data from a system memory;

selecting a region from a plurality of regions of a cache memory in which to store a copy of the retrieved portion of data;

storing a copy of the retrieved portion of data in the selected region of the cache memory;

storing address information identifying a region of the system memory from which the portion of data stored in the cache memory was retrieved; and identifying whether or not a region of the cache memory contains data that has been accessed from the cache memory by a device external to the cache memory system;

wherein the plurality of regions of the cache memory comprises (i) a vacant region, (ii) a region identified as containing data that has been accessed by the device external to the cache memory system, and (iii) a region identified as containing data that has not been accessed by the device external to the cache memory system, and wherein the region of the system memory from which the data was retrieved is outside one or more defined address ranges of system memory.

15. The method according to claim 14, wherein the cache memory system is part of a level 2 cache.

16. The method according to claim 14, wherein the cache memory comprises one or more cache lines, each cache line being arranged to store a copy of a portion of data retrieved from a region of the system memory.

17. The method according to claim 16, wherein the status memory comprises a series of status values, each cache line being associated with a status value, each status value being set to a first value if the data stored in the corresponding cache line has been accessed by the device external to the cache memory system and set to a second value if the data stored in the corresponding cache line has not been accessed by the device external to the cache memory system.

18. The method according to claim 17, wherein the status value corresponding to a first cache line is set to the second value when data is initially stored in the first cache line as a result of a data pre-fetch.

19. The system according to claim 13, wherein the cache load circuit is configured to select the region of the cache memory in which to store the retrieved portion of data according to at least one status value located in status memory.

20. The system according to claim 19, wherein if a region of the cache memory cannot be selected for storing the retrieved portion of data, the cache load circuit is arranged to not store the retrieved portion of data in the cache memory.

* * * * *